US010551627B2

(12) United States Patent
Gao et al.

(10) Patent No.: US 10,551,627 B2
(45) Date of Patent: Feb. 4, 2020

(54) 3D DISPLAY DEVICE

(71) Applicants:BOE Technology Group Co., Ltd., Beijing (CN); Beijing BOE Optoelectronics Technology Co., Ltd., Beijing (CN)

(72) Inventors: Jian Gao, Beijing (CN); Xiaochuan Chen, Beijing (CN); Wenqing Zhao, Beijing (CN); Pengcheng Lu, Beijing (CN); Ming Yang, Beijing (CN); Qian Wang, Beijing (CN); Xiaochen Niu, Beijing (CN); Rui Xu, Beijing (CN); Lei Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 129 days.

(21) Appl. No.: 15/511,558

(22) PCT Filed: May 27, 2016

(86) PCT No.: PCT/CN2016/083710
§ 371 (c)(1),
(2) Date: Mar. 15, 2017

(87) PCT Pub. No.: WO2017/117907
PCT Pub. Date: Jul. 13, 2017

(65) Prior Publication Data
US 2018/0149875 A1 May 31, 2018

(30) Foreign Application Priority Data

Jan. 8, 2016 (CN) .......................... 2016 1 0011813
Feb. 25, 2016 (CN) .......................... 2016 1 0105813

(51) Int. Cl.
*G02F 1/1343* (2006.01)
*G02B 27/22* (2018.01)
(Continued)

(52) U.S. Cl.
CPC ............... *G02B 27/22* (2013.01); *G02B 5/18* (2013.01); *G02F 1/1343* (2013.01); *G02F 1/133602* (2013.01)

(58) Field of Classification Search
CPC ......... G02B 27/225; G02B 27/22; G02B 5/18
(Continued)

(56) References Cited

U.S. PATENT DOCUMENTS 8,305,511 B2 11/2012 Shiau et al.
2011/0221996 A1* 9/2011 Shiau ..................... H04N 13/31
349/62
(Continued)

FOREIGN PATENT DOCUMENTS

CN 101887185 A 11/2010
CN 102830537 A 12/2012
(Continued)

OTHER PUBLICATIONS

Jul. 19, 2017—(CN) First Office Action Appn 201610105813.6 with English Tran.

*Primary Examiner* — James A Dudek
(74) *Attorney, Agent, or Firm* — Banner & Witcoff, Ltd.

(57) ABSTRACT

A 3D display device is provided. The 3D display device includes a display panel and a light source, the display panel including a first substrate and a second substrate, wherein, the light source is disposed on a side surface of the first substrate, and configured to emit light into the first substrate, wherein, light is propagated in the first substrate in a total reflection manner; the 3D display device further includes a light adjustment structure disposed on a surface of the first (Continued)

substrate facing the second substrate; the light adjustment structure is configured to adjust an emergent direction of light incident into the light adjustment structure from the first substrate, such that a first part of light emerging from the light adjustment structure is propagated in a left eye direction through a first display unit of the display panel, and a second part of light emerging from the light adjustment structure is propagated in a right eye direction through a second display unit of the display panel. Thus, a utilization rate and brightness of light can be improved, and a thickness of the display device is reduced.

17 Claims, 3 Drawing Sheets

(51) Int. Cl.
*G02B 5/18* (2006.01)
*G02F 1/1335* (2006.01)

(58) Field of Classification Search
USPC .............................................. 349/15
See application file for complete search history.

(56) References Cited

U.S. PATENT DOCUMENTS

| | | |
|---|---|---|
| 2013/0033752 A1 | 2/2013 | Chen et al. |
| 2014/0063601 A1 | 3/2014 | Qu |
| 2014/0300840 A1* | 10/2014 | Fattal ................ G02F 1/133615 349/15 |
| 2016/0266394 A1 | 9/2016 | Yon |
| 2018/0172893 A1* | 6/2018 | Fattal ................... G02B 6/0018 |

FOREIGN PATENT DOCUMENTS

| | | |
|---|---|---|
| CN | 103080821 A | 5/2013 |
| CN | 103885229 A | 6/2014 |
| CN | 104297931 A | 1/2015 |
| CN | 205562973 U | 9/2016 |

* cited by examiner

3D DISPLAY DEVICE

The application is a U.S. National Phase Entry of International Application No. PCT/CN2016/083710 filed on May 27, 2016, designating the United States of America and claiming priority to Chinese Patent Application No. 201610011813.X filed on Jan. 8, 2016 and Chinese Patent Application No. 201610105813.6 filed on Feb. 25, 2016. The present application claims priority to and the benefit of the above-identified applications and the above-identified applications are incorporated by reference herein in their entirety.

TECHNICAL FIELD

Embodiments of the present disclosure relate to a 3D display device.

BACKGROUND

At present, three-dimensional (3D) display is greatly favored by a vast number of consumers, due to its real and vivid expressiveness, graceful and elegant environmental appeal, and intensive and shocked visual impact.

The 3D display at an early stage requires a viewer to wear corresponding 3D glasses, so that its application is limited to occasions and devices. A naked-eye 3D display device developed in recent years overcomes the constraint of special glasses, and thus draws a wide attention.

An existing naked-eye 3D technology is mainly realized in three modes, which are respectively: a directional backlight mode, a parallax barrier mode and a cylindrical lens array mode.

A directional backlight technology needs two backlight sources when displaying a 3D image. The two backlight sources are lightened up alternatively in sequence and respectively emit light to left and right eyes through corresponding display units; and since the human eyes have a certain persistence of vision characteristic, alternately emerged pictures form a 3D picture in a human brain. However, a light source of the directional backlight technology needs to be used in a time-sharing manner, and thus cannot meet a requirement on definition, the technology is also relatively complex and a 3D effect is poorer.

A parallax barrier technology is to manufacture a series of vertical stripes in a direction of 90° C. by using a liquid crystal layer and a polarization film. These stripes are dozens of micrometers wide, vertical narrow strips are formed by light pass therethrough; and in turn, visible pictures of the left eye and the right eye are divided. Therefore, 3D display is realized. But a transmittance of parallax barrier light is lower than 50%, the brightness is insufficient and the size is large.

A cylindrical lens array technology is to add a layer of cylindrical lens in front of a liquid crystal screen, an image plane of the liquid crystal screen is located on a focal plane of the lens; in this way, an image will be presented on the focal plane of the lens, and therefore, respective pixel points in the image are presented in the left eye and the right eye through the lens, and a 3D picture is formed in the human brain. Although the cylindrical lens array mode is improved to some extent in transmittance compared with the parallax barrier mode, it has a larger impact on normal display of a 2D image, and brings certain optical parallax to the image.

SUMMARY

An embodiment of the present disclosure provides a 3D display device, comprising a display panel and a light source, the display panel including a first substrate and a second substrate, wherein the light source is disposed on a side surface of the first substrate, and configured to emit light into the first substrate, wherein light is propagated in the first substrate in a total reflection manner; the 3D display device further comprises a light adjustment structure disposed on a surface of the first substrate facing the second substrate; the light adjustment structure is configured to adjust an emergent direction of light incident into the light adjustment structure from the first substrate, such that a first part of light emerging from the light adjustment structure is propagated in a left eye direction through a first display unit of the display panel, and a second part of light emerging from the light adjustment structure is propagated in a right eye direction through a second display unit of the display panel.

BRIEF DESCRIPTION OF THE DRAWINGS

In order to more clearly explain technical solutions of present disclosure or prior art, the drawings required in description of the embodiments or the prior art will be briefly introduced. It is obvious that the described drawings below are some embodiments of the present disclosure, and those ordinary skilled in the art can obtain other drawings according to these drawings, without paying any inventive work.

DETAILED DESCRIPTION

The technical solutions of embodiments of the present disclosure will be described in a clearly and fully understandable way in connection with the drawings. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical or scientific terms used in the present application should be the general meaning understood by those skilled in the art. The terms "first", "second" and similar words used in the specification and claims do not represent any order, quantity or importance, and are merely intended to differentiate different constituting parts.

The embodiments of the present disclosure provide a 3D display device and a new display device to realize naked-eye 3D, capable of improving a utilization rate and brightness of light and reducing a thickness of the display device.

Figure 1:
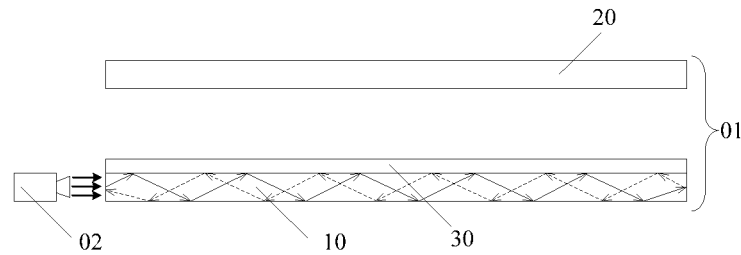
FIG. 1 is a structural schematic diagram I of a 3D display device provided by an embodiment of the present disclosure.

An embodiment of the present disclosure provides a 3D display device, as shown in FIG. 1, including a display panel 01 and a light source 02. The display panel 01 includes a first substrate 10 and a second substrate 20 disposed oppositely. The light source 02 is disposed on a side surface of the first substrate 10. Light emitted from the light source 02 is incident into the first substrate 10, and is propagated in the first substrate 10 in a total reflection manner (as shown by an arrow in the first substrate in FIG. 1).

Figure 2:
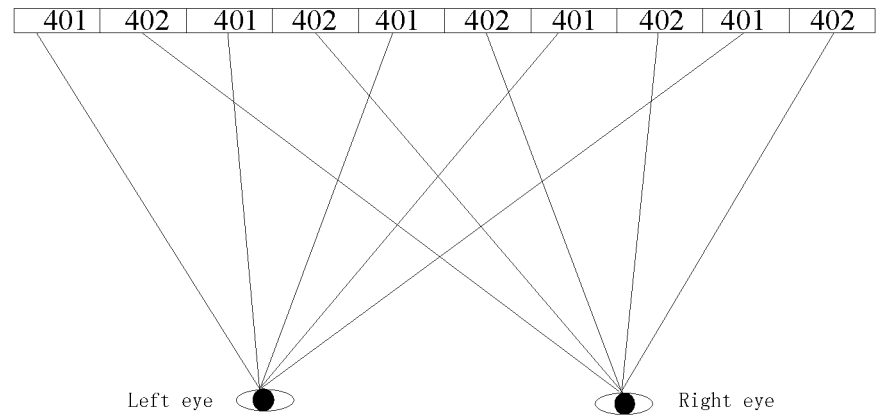
FIG. 2 is a principle schematic diagram of a 3D display device provided by an embodiment of the present disclosure.

The 3D display device further includes a light adjustment structure 30, disposed on a surface of the first substrate 10 close to the second substrate 20. Referring to FIG. 1, the light adjustment structure 30 is disposed on a main surface of the first substrate 10 facing the second substrate 20. The light adjustment structure 30 is configured for adjusting an emergent direction of the light incident into the light adjustment structure 30, such that the emergent light is, as shown in FIG. 2, emitted to a left eye through a first display unit 401 of the display panel and emitted to a right eye through a second display unit 402 of the display panel.

It is noted that firstly, the display panel 01 can be a passive light-emitting display panel.

Secondly, the light source 02 can be disposed on a side surface of the first substrate 10, or can be disposed on several side surfaces of the first substrate 10 respectively. The first substrate 10 has a lower main surface away from the second substrate 20, in addition to the upper main surface facing the second substrate 20. The side surfaces of the first substrate 10 are located between the upper main surface and the lower main surface. In order to simplify the structure of the 3D display device, for example, the light source 02 is only disposed on one side surface of the first substrate 10. Herein, the side surface of the first substrate 10 is not limited to an emergent light surface of the first substrate 10 and a plane parallel with the emergent light surface.

The type of the light source 02 is not limited, and for example, can be a Light Emitting Diode (LED).

The light emitted from the light source 02 for example can be parallel light, and an angle of the parallel light relative to the side surface of the first substrate 10 is adjusted so that the parallel light emitted from the light source 02, after incident into the first substrate 10, can be propagated in the first substrate 10 in the total reflection manner; or the light emitted from the light source 02 for example can be divergent light having a certain angle, and an angle of outermost side light of the divergent light relative to the side surface of the first substrate 10 is adjusted so that the outermost side light of the light source 02, after incident into the first substrate 10, can be propagated in the first substrate 10 in the total reflection manner; Because the angle of the outermost side light of the divergent light relative to the side surface of the first substrate 10 is minimal, if the outermost side light of the divergent light emitted by the light source 02 is propagated in the total reflection manner after incident into the first substrate 10, then all other types of light in the divergent light, after incident into the first substrate 10, can be propagated in the total reflection manner.

Herein, referring to FIG. 1, the light emitted by the light source 02 can be propagated in a base substrate of the first substrate 10 in the total reflection manner, or propagated in one of film layers disposed on the base substrate in the total reflection manner. For example, light is propagated in the total reflection manner, which means that the total reflection not only can occur on the upper and lower main surfaces of a corresponding medium (for example, a base substrate), but also can occur on a side surface.

Thirdly, the light adjustment structure 30 is disposed on the surface, close to the second substrate 20, of the corresponding medium (for example the base substrate) subjected to total reflection in the first substrate 10.

A specific structure of the light adjustment structure 30 is not limited; after the light is adjusted through the light adjustment structure 30, the light is emitted to a left or right eye direction. The light emitted to the left eye direction is incident into the left eye through the first display unit 401 of the display panel, and the light emitted to the right eye direction is incident into the right eye through the second display unit 402 of the display panel.

Fourthly, FIG. 1 only schematically shows a corresponding medium layer of the first substrate 10 where total reflection occurs, and the light adjustment structure 30 located on a main surface of such medium layer close to the second substrate 20, and other parts unrelated to inventive points are not shown.

According to the embodiment of the present disclosure, the light source 02 is disposed on the side surface of the first substrate 10, and the light emitted by the light source 02 is propagated in the first substrate 10 in the total reflection manner; when the light meets the light adjustment structure 30, the light adjustment structure 30 can adjust a direction of the light emitted into the light adjustment structure 30, such that the light is emitted to the left eye and the right eye through the first display unit 401 and the second display unit 402 respectively. On such basis, light transmittance of the first display unit 401 and the second display unit 402 is controlled, such that a left eye image displayed by the first display unit 401 and a right eye image displayed by the second display unit 402 are different, and naked-eye 3D display can be realized. The light emitted from the light source 02 in the display device, during traveling in the first substrate 10 in the total reflection manner, can be emitted out through the light adjustment structure 30. Therefore, a utilization rate of the light emitted from the light source 02 is improved. In addition, the 3D display device does not block the light or use the light in a time-sharing manner, and therefore, light brightness is increased compared to an existing naked-eye 3D display technology. Further, since the light source 02 is disposed on the side surface of the device, a thickness of the display device can be reduced.

For example, the light emergent after being adjusted by the light adjustment structure 30 corresponds to a light-transmissive region of the first display unit 401 or the second display unit 402.

The light emergent after being adjusted by the light adjustment structure 30 corresponds to the light-transmissive region of the first display unit 401 or the second display unit 402, means that, the light adjusted by the light adjustment structure 30 is only emergent to the light-transmissive region of the first display unit 401 or the second display unit 402 without being emitted to a non-light-transmissive region of the first display unit 401 or the second display unit 402. That is, all the light emergent after being adjusted by the light adjustment structure 30 is emitted to the left eye through the light-transmissive region of the first display unit 401 and emitted to the right eye through the light-transmissive region of the second display unit 402.

Therein, each display unit includes a light-transmissive region and a non-light-transmissive region, light can transmit through the light-transmissive region, but cannot transmit through the non-light-transmissive region, and the non-light-transmissive region includes a region where a thin film transistor is located.

In the embodiment of the present disclosure, the light emergent after being adjusted by the light adjustment structure 30 is always emergent from the light-transmissive region of the first display unit 401 or the second display unit 402, and therefore, no matter how many an aperture ratio of the first display unit 401 or the second display unit 402 is, a brightness of the light emergent through the first display unit 401 or the second display unit 402 is unchanged. Therefore, in one aspect, the brightness of the 3D display device in the embodiment of the present disclosure is not affected by the aperture ratio; in another aspect, the light is emergent through the light-transmissive region of the first display unit 401 or the second display unit 402, such that a utilization rate of the light source is improved and the brightness of the 3D display device is increased.

Figure 3A:
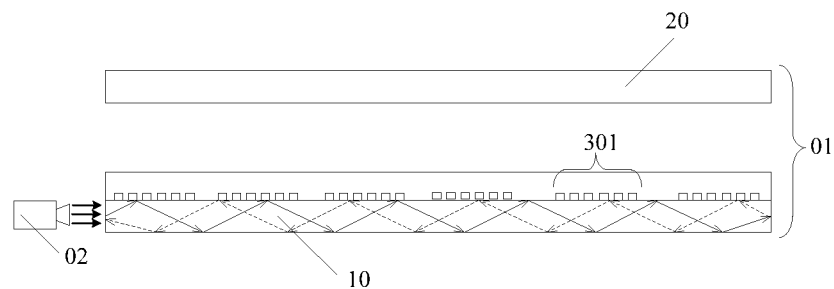
FIG. 3(a) is a sectional structural schematic diagram of a 3D display device provided by an embodiment of the present disclosure, wherein a light adjustment structure is of a grating sub-pixel.
Figure 3B:
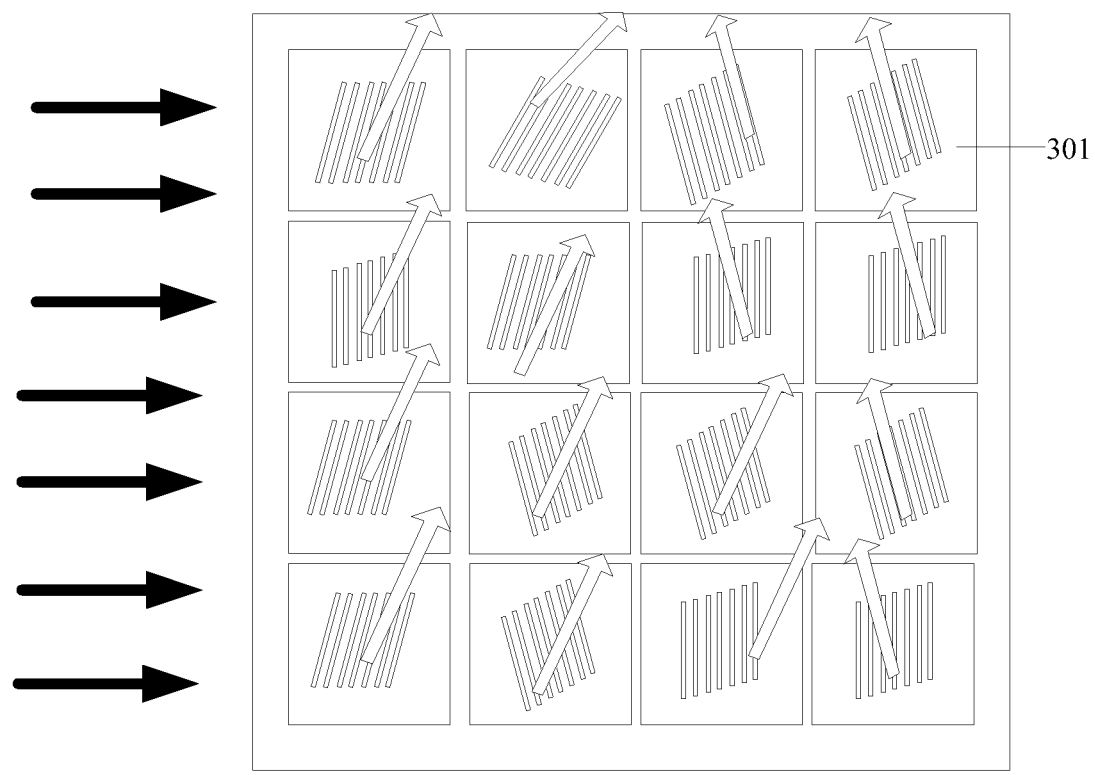
FIG. 3(b) is a top structural schematic diagram of the 3D display device provided by an embodiment of the present disclosure, wherein the light adjustment structure is of a grating sub-pixel.

Optionally, as shown in FIGS. 3(a) and 3(b), the light adjustment structure 30 includes a grating sub-pixel 301; by setting a width, a length and a tilt angle of the grating sub-pixel 301, the light emergent from the first display unit 401 and the second display unit 402 of the display panel is emitted to the left eye and right eye, respectively.

The grating sub-pixel 301 extracts incident light through light diffraction; the light emergent after passing through the grating sub-pixel 301 is linearly polarized light of which an emergent direction can be controlled, wherein the direction of the light can be precisely controlled according to the width, the length and the tilt angle of the grating sub-pixel 301.

Herein, the number of gratings in the grating sub-pixel 301 is not defined, and for example can be 3, 5, or more.

According to the embodiment of the present disclosure, by setting parameters such as the width, the length and the tilt angle of the grating sub-pixel 301, the light emitted by the light source 02 can be adjusted to the left eye direction and the right eye direction, and then transmitted to the left eye and right eye through the first display unit 401 and the second display unit 402 of the display panel respectively.

Figure 4A:
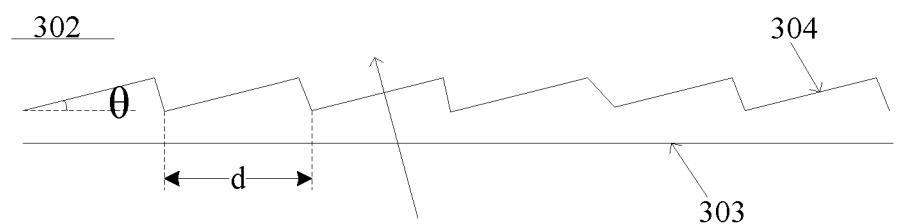
FIG. 4(a) is a structural schematic diagram I of a microstructure provided by an embodiment of the present disclosure.
Figure 4B:
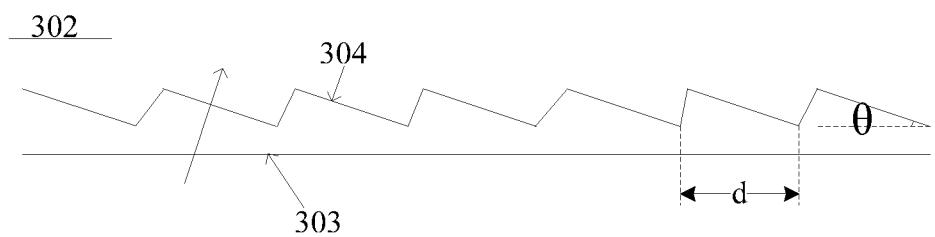
FIG. 4(b) is a structural schematic diagram II of a microstructure provided by an embodiment of the present disclosure.

Optionally, as shown in FIGS. 4(a) and 4(b), the light adjustment structure 30 includes a plurality of microstructures 302, each of which includes a grating surface 303 and groove surfaces 304, the grating surface 303 and the groove surfaces 304 have an included angle θ, and by setting the acute angle θ between the groove surfaces 304 and the grating surface 303 and an interval d between adjacent groove surfaces 304, the light of a predetermined wavelength emergent from the first display unit 401 and the second display unit 402 of the display panel is respectively transmitted to the left eye and the right eye.

When incident light is perpendicular to the groove surface 304 and meets 2d·sin θ=λ, since the emergent light perpendicular to the groove surface 304 is in a central main maximal position of diffraction light of the single groove surface, energy of the emergent light perpendicular to the groove surface 304 is the largest, that is, a light beam of such wavelength is emergent in a shine reinforcing manner at a specific angle (an angle perpendicular to the groove surface), and the emergent light through the microstructures 302 is linearly polarized light. Herein, by designing different d and θ values, different emergent angles and different emergent light wavebands can be obtained.

For example, by designing an acute angle θ between the grating surface 303 and the groove surface 304 in each microstructure 302, a direction of light emerging from such microstructure 302 can be adjusted, such that the light can be transmitted to the left eye and the right eye respectively through the first display unit 401 and the second display unit 402.

In the embodiment of the present disclosure, the acute angle θ between the grating surface 303 and the groove surface 304 in each microstructure 302 can be same, such that the light emergent after being adjusted by the same microstructures 302 is same in direction. On such basis, the acute angles θ between the grating surface 303 and the groove surfaces 304 in two adjacent microstructures 302 may be different. On such basis, as shown in FIG. 2, after being adjusted by the microstructures 302, the light passing through the first display unit 401 is converged to the left eye, and the light passing through the second display unit 402 is converged to the right eye.

In addition, according to the formula 2d·sin θ=λ, it can be known that a wavelength λ of the emergent light is related to the interval d between the adjacent groove surfaces 304 and the acute angle between the grating surface 303 and the groove surface 304. In a case that the acute angles θ between the grating surface 303 and the groove surfaces 304 is fixed, the interval d between the adjacent groove surfaces 304 in each microstructure 302 is not totally the same, such that the wavelengths λ of emergent light after adjustment of the same microstructure 302 is not totally the same, and the emergent light of different wavelengths can form white light after overlapping.

In the embodiment of the present disclosure, since light beam is emergent in a shine reinforcing manner if the incident light is perpendicular to the groove surface 304, parallel light at a preset angle can be selected and is emergent in a shine reinforcing manner by adjusting the acute angle θ between the groove surface 304 and the grating surface 303 in each microstructure. Therefore, on a basis that the emergent light from the first display unit 401 and the second display unit 402 is respectively emitted to the left eye and the right eye, energy of the output light is more concentrated, and the brightness of the output light is ensured. On this basis, by setting the interval d between the adjacent groove surfaces 304, the emergent light of different wavelengths can form white light after overlapping.

Figure 5:
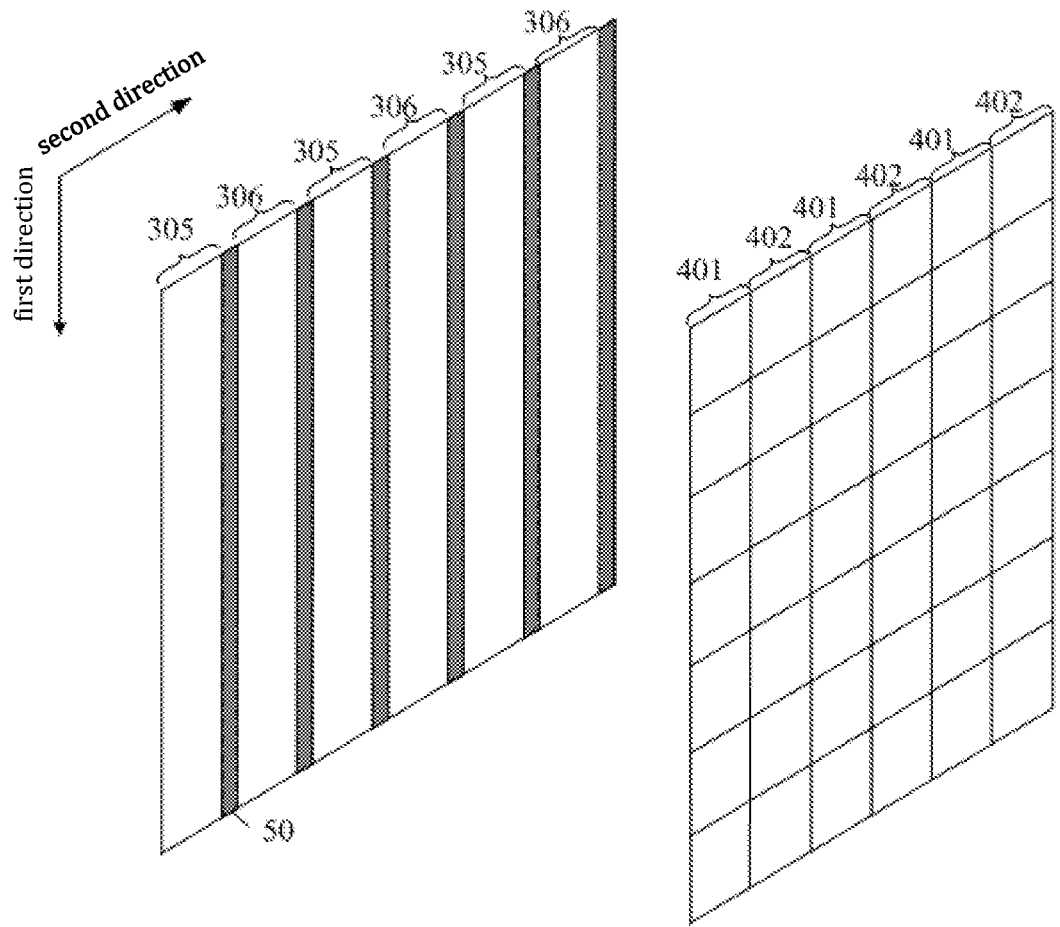
FIG. 5 is a schematic diagram of a corresponding relationship between microstructures and display units provided by an embodiment of the present disclosure.

For example, as shown in FIG. 5, the microstructure 302 includes a first microstructure 305 and a second microstructure 306, which are both strip-shaped. The first microstructure 305 corresponds to the first display unit 401 of the first display panel 01 extending in a first direction, and the second microstructure 306 corresponds to the second display unit 402 of the display panel 01 extending along the first direction. For example, referring to FIG. 5, three first display units 401 and three second display units 402 are shown. Each first display unit 401 is shown by 7 lattices, and each second display unit 402 is shown in by 7 lattices. The first display units 401 and the second display units 402 are disposed alternately along a second direction; and the second direction is perpendicular to the first direction.

Herein, the first microstructure 305 and the second microstructure 306 are configured for adjusting a direction of light incident thereto into a left eye direction and a right eye direction, respectively. Herein, the left eye direction is a direction toward the left eye of a viewer; the right eye direction is a direction toward the right eye of a viewer; the first microstructure 305 can adjust the light incident thereto into the left eye direction, and the light is transmitted to the left eye through the first display unit 401; and the second microstructure 306 can adjust the light incident thereto into the right eye direction, and the light is transmitted to the right eye through the second display unit 402.

For example, a length of the first microstructure 305 along the second direction can be same as that of the first display unit 401 along the second direction, and a length of the first microstructure 305 along the first direction can be same as that of the first display unit 401 along the first direction. Similarly, a length of the second microstructure 306 along the second direction can be same as that of the second display unit 401 along the second direction, and a length of the second microstructure 306 along the first direction can be same as that of the second display unit 402 along the first direction.

In addition, since the first display units 401 and the second display units 402 are alternately disposed along the second direction, the first microstructures 305 corresponding to the first display units 401 and the second microstructures 306 corresponding to the second display units 402 are alternately disposed along the second direction.

It should be noted that FIG. 5 takes the second direction being a horizontal direction and the first direction being a vertical direction as an example for explanation.

In the embodiment of the present disclosure, by setting the first microstructure 305 and the second microstructure 306 to be strip-shaped, each first microstructure 305 corresponds to a row of display units, each second microstructure 306 corresponds to one row of display units, and a manufacturing process of the first microstructure 30 and the second microstructure 306 can be simplified.

For example, as shown in FIG. 5, the 3D display device further includes a reflection structure 50 disposed on a surface of the first substrate 10 where total reflection occurs. For example, the reflection structure 50 is disposed on a surface of the first substrate 10 facing the second substrate 20, and in a direction perpendicular to the surface of the first substrate 10 facing the second substrate 20, the reflection structure 50 and the light adjustment structure 30 do not overlap.

For example, the structure of the reflection structure 50 is not limited, it can be a film layer with high reflectivity, and light is reflected when meeting the reflection structure 50.

On a surface of the first substrate 10 close to the second substrate 20, the refection structure 50 and the light adjustment structure 30 do not overlap. The light emitted from the light source 02 is propagated in the total reflection manner when meeting the reflection structure 50, and is emergent in an adjusted direction after being adjusted by the light adjustment structure 30 when meeting the light adjustment structure 30.

In the embodiment of the present disclosure, by arrangement of the reflection structure 50, it can be ensured that the light emitted by the light source 02 is propagated in the first substrate 10 all in the total reflection manner. On this basis, the light is emergent all through the light adjustment structure 30 in a total reflection propagation process in the first substrate 10 and a utilization rate of the light is improved.

Figure 6:
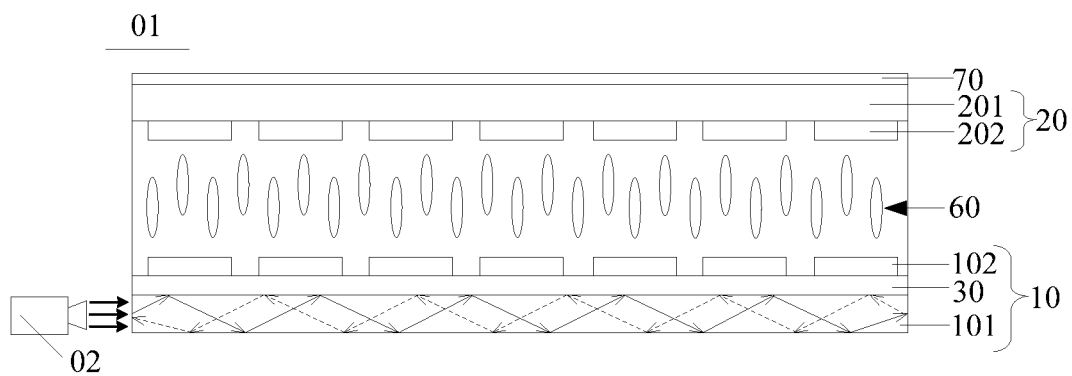
FIG. 6 is a structural schematic diagram II of a 3D display device provided by an embodiment of the present disclosure.

For example, as shown in FIG. 6, the 3D display device further includes a liquid crystal layer 60 disposed between the first substrate 10 and the second substrate 20 and a polarizing sheet 70 disposed on a side of the second substrate 20 away from the liquid crystal layer 60. For example, a vibration direction of the light emitted from the light adjustment structure 30 is perpendicular to a transmission axis of the polarizing sheet 70.

In a liquid crystal display, the polarizing sheet has functions of converting a natural light source into linearly polarized light, by absorbing light with a polarization direction parallel with the absorption axis and substantially transmitting light in a direction parallel with the transmission axis. After transmitting through the polarizing sheet, the natural light vibrating in all directions is changed into polarized light of which the vibration direction is parallel with the transmission axis. Liquid crystal molecules with a torsional characteristic are added between polarizing sheets of which the transmission axes are perpendicular to each other, then the light is controlled to pass through, and the aim of image display is achieved.

On such basis, light emitted from the light source 02 can be linearly polarized light after being adjusted by the light adjustment structure 30, and a vibration direction of the linearly polarized lights is perpendicular to a transmission axis of the polarizing sheet 70 on a side of the second substrate 20 away from the liquid crystal layer 60; therefore, there is no need to dispose a polarizing sheet on a side of the first substrate 10 away from the liquid crystal layer 60, a manufacturing process of the display device is simplified, and since a polarizing sheet is omitted, the finished display device is thinner.

In the embodiment of the present disclosure, the light emitted by the light source 02 is subjected to total reflection in the first substrate 10; when the light meets the light adjustment structure on the first substrate 10, after being adjusted by the light adjustment structure 30, the light is transmitted to the left eye or the right eye through the first display unit 401 and the second display unit 402 respectively. And, the emergent light adjusted by the light adjustment structure 30 is all linearly polarized light. On this basis, by adjusting a deflection direction of liquid crystals in the first display unit 401 and the second display unit 402, a light transmittance of the first display unit 401 and the second display unit 402 can be controlled, such that the a left eye image displayed by the first display unit 401 and a right eye image displayed by the second display unit 402 are different, and naked-eye 3D display is realized.

For example, as shown in FIG. 6, the first substrate 10 includes a first transparent base substrate 101 and display elements 102 disposed on the first transparent base substrate 101 and in respective display units; the light source 02 is disposed on a side surface of the first transparent base substrate 101; the light adjustment structure 30 is disposed on a surface of the first transparent base substrate 101 close to the liquid crystal layer 60.

For example, the first transparent base substrate 101 may be a glass substrate.

It is noted that the light adjustment structure 30 is disposed on the surface of the first transparent base substrate 101 close to the liquid crystal layer 60, the display element 102 is in direct contact with the light adjustment structure 30; or a transition structure can be disposed between the display element and the light adjustment structure 30 according to actual conditions.

The display element 102 can be understood as an essential structure disposed on the first transparent base substrate 101 and consisting of respective pattern layers corresponding to a smallest display unit of the first substrate 10. The first substrate 10 includes a plurality of display elements 102.

Further, for example, each display element 102 includes a thin film transistor and a pixel electrode layer. The thin film transistor includes a gate electrode, a gate insulating layer, a semiconductor active layer, a source electrode and a drain electrode, wherein the drain electrode and the pixel electrode are electrically connected.

For example, the pixel electrode can be made of, for example, Indium Tin Oxides (ITO), Indium Zinc Oxide (IZO), etc.

The thin film transistor is a semiconductor unit having a switching characteristic, and can be of a top gate type or a bottom gate type.

Further, for example, the display element 102 further includes a common electrode.

Regarding an In-Plane Switch (IPS) array substrate, pixel electrodes and common electrodes are alternately disposed on the same layer, and are both strip electrodes; regarding an Advanced-super Dimensional Switching (ADS) array substrate, the pixel electrodes and the common electrodes are disposed on different layers, for example, the electrodes located above are strip electrodes, and the electrodes located below are plate electrodes or strip electrodes.

For example, the second substrate 20 includes a second transparent base substrate 201 and filter patterns 202 disposed on the second transparent base substrate 201 and located in respective display units.

For example, the filter patterns can be red filter pattern, green filter pattern and blue filter pattern, or filter patterns of other three primary colors.

In the embodiment of the present disclosure, compared with disposing the filter patterns 202 on the first substrate 10, the filter patterns 202 are disposed on the second substrate 20, and the manufacturing process of the first substrate 10 is simplified.

On above basis, the display device of the embodiment of the present disclosure can be any product or part having a display function, such as a passive light-emitting mobile phone, a tablet computer, a display, a laptop and a digital photo frame.

Although the present disclosure is explained in detail with common explanation and specific embodiments, and on the basis of the present disclosure, it is obvious for those ordinary skilled to make some modifications or improvements. Therefore, these modifications or improvements made on the basis of not departing from a spirit of the present disclosure fall within a scope to be protected by the present disclosure.

The application claims priority of Chinese Patent Application No. 201610011813.X filed on Jan. 8, 2016 and Chinese Patent Application No. 201610105813.6 filed on Feb. 25, 2016 , the disclosure of which are incorporated herein by reference in their entirety as part of the present application.

The invention claimed is:

1. A 3D display device, comprising a display panel and a light source, the display panel including a first substrate and a second substrate, wherein
the light source is disposed on a side surface of the first substrate, and is configured to emit light into the first substrate, wherein light is propagated in the first substrate in a total reflection manner;
the 3D display device further comprises a light adjustment structure disposed on a surface of the first substrate facing the second substrate;
the light adjustment structure is configured to adjust an emergent direction of light incident into the light adjustment structure from the first substrate, such that a first part of light emerging from the light adjustment structure is propagated in a left eye direction through first display units of the display panel, and a second part of light emerging from the light adjustment structure is propagated in a right eye direction through second display units of the display panel; and
the light adjustment structure includes a plurality of microstructures, the plurality of microstructures include first microstructures and second microstructures which are both strip-shaped; first microstructures correspond to the first display units extending in a first direction on the display panel, respectively; second microstructures correspond to the second display units extending in the first direction on the display panel, respectively; the first display units and the second display units are alternately disposed along a second direction; and a strip-shaped reflection structure extending in the first direction is disposed between every adjacent the first microstructure and the second microstructure.

2. The 3D display device according to claim 1, wherein light is adjusted by the light adjustment structure and emergent to correspond to a light-transmissive region of the first display unit or the second display unit.

3. The 3D display device according to claim 1, wherein the light adjustment structure includes a grating sub-pixel, a width, a length and a tilt angle of the grating sub-pixel are set to enable the first part of light emerging from the light adjustment structure to be propagated in a left eye direction through the first display units of the display panel, and to enable the second part of light emerging from the light adjustment structure to be propagated in a right eye direction through the second display units of the display panel.

4. The 3D display device according to claim 1, wherein each of the plurality of microstructures includes a plurality of groove surfaces and a grating surface, an acute angle is formed between each of the groove surfaces and the grating surface; by setting the acute angles between the groove surfaces and the grating surface as well as the interval between adjacent groove surfaces, the first part of light emerging from the light adjustment structure is propagated in a left eye direction through the first display units of the display panel, and the second part of light emerging from the light adjustment structure is propagated in a right eye direction through the second display units of the display panel.

5. The 3D display device according to claim 4, wherein the first direction is perpendicular to the second direction.

6. The 3D display device according to claim 1, wherein the reflection structure is disposed on a surface of the first substrate where total reflection occurs, and
wherein in a direction perpendicular to a surface of the first substrate facing the second substrate, the reflection structure and the light adjustment structure do not overlap.

7. The 3D display device according to claim 6, wherein the reflection structure is disposed on the surface of the first substrate facing the second substrate.

8. The 3D display device according to claim 1, further comprising a liquid crystal layer disposed between the first substrate and the second substrate and a polarizing sheet disposed on a side of the second substrate away from the liquid crystal layer,
wherein a vibration direction of the light emerging from the light adjustment structure is perpendicular to a transmission axis of the polarizing sheet.

9. The 3D display device according to claim 1, further comprising a liquid crystal layer disposed between the first substrate and the second substrate, wherein the first substrate includes a first transparent base substrate and a display element disposed on the first transparent base substrate and located at each display unit;

the light source is disposed on a side surface of the first transparent base substrate; and the light adjustment structure is disposed on a surface of the first transparent base substrate close to the liquid crystal layer.

10. The 3D display device according to claim 9, wherein the display element includes a thin film transistor and a pixel electrode electrically connected to a drain electrode of the thin film transistor.

11. The 3D display device according to claim 10, wherein the display element further includes a common electrode.

12. The 3D display device according to claim 1, wherein the second substrate includes a second transparent base substrate and a filter pattern disposed on the second transparent base substrate and located at each display unit.

13. The 3D display device according to claim 2, wherein the light adjustment structure includes a grating sub-pixel, a width, a length and a tilt angle of the grating sub-pixel are set to enable the first part of light emerging from the light adjustment structure to be propagated in a left eye direction through the first display units of the display panel, and to enable the second part of light emerging from the light adjustment structure to be propagated in a right eye direction through the second display units of the display panel.

14. The 3D display device according to claim 2, wherein each of the plurality of microstructures includes a plurality of groove surfaces and a grating surface, an acute angle is formed between each of the groove surfaces and the grating surface; by setting the acute angles between the groove surfaces and the grating surface as well as the interval between adjacent groove surfaces, the first part of light emerging from the light adjustment structure is propagated in a left eye direction through the first display units of the display panel, and the second part of light emerging from the light adjustment structure is propagated in a right eye direction through the second display units of the display panel.

15. The 3D display device according to claim 3, wherein each of the plurality of microstructures includes a plurality of groove surfaces and a grating surface, an acute angle is formed between each of the groove surfaces and the grating surface; by setting the acute angles between the groove surfaces and the grating surface as well as the interval between adjacent groove surfaces, the first part of light emerging from the light adjustment structure is propagated in a left eye direction through the first display units of the display panel, and the second part of light emerging from the light adjustment structure is propagated in a right eye direction through the second display units of the display panel.

16. The 3D display device according to claim 13, wherein each of the plurality of microstructures includes a plurality of groove surfaces and a grating surface, an acute angle is formed between each of the groove surfaces and the grating surface; by setting the acute angles between the groove surfaces and the grating surface as well as the interval between adjacent groove surfaces, the first part of light emerging from the light adjustment structure is propagated in a left eye direction through the first display units of the display panel, and the second part of light emerging from the light adjustment structure is propagated in a right eye direction through the second display units of the display panel.

17. The 3D display device according to claim 2, wherein the reflection structure is disposed on a surface of the first substrate where total reflection occurs, wherein in a direction perpendicular to a surface of the first substrate facing the second substrate, the reflection structure and the light adjustment structure do not overlap.

* * * * *